US007378819B2

(12) United States Patent
Wang et al.

(10) Patent No.: US 7,378,819 B2
(45) Date of Patent: May 27, 2008

(54) SYSTEMS AND METHODS FOR REGULATING PULSED PRE-CHARGE CURRENT IN A BATTERY SYSTEM

(75) Inventors: Ligong Wang, Round Rock, TX (US); John J. Breen, Harker Heights, TX (US); Joey M. Goodroe, Austin, TX (US)

(73) Assignee: Dell Products LP, Round Rock, TX (US)

(*) Notice: Subject to any disclaimer, the term of this patent is extended or adjusted under 35 U.S.C. 154(b) by 197 days.

(21) Appl. No.: 11/034,624

(22) Filed: Jan. 13, 2005

(65) Prior Publication Data

US 2006/0152194 A1 Jul. 13, 2006

(51) Int. Cl.
*H02J 7/00* (2006.01)

(52) U.S. Cl. ...................... 320/121; 320/112; 320/114; 320/134; 320/163

(58) Field of Classification Search ................ 320/121, 320/163

See application file for complete search history.

(56) References Cited

U.S. PATENT DOCUMENTS 5,196,780 A 3/1993 Pacholok ..................... 320/40
5,200,690 A 4/1993 Uchida ........................ 320/20
5,420,493 A 5/1995 Hargadon et al. ............ 320/15
5,440,502 A 8/1995 Register .................. 364/708.1
5,512,813 A * 4/1996 Uchinami .................... 322/28
5,523,671 A 6/1996 Stewart ....................... 320/39
5,528,122 A * 6/1996 Sullivan et al. ............. 320/118
5,561,361 A 10/1996 Sengupta et al.
5,576,609 A 11/1996 Brown et al. ................. 320/30
5,659,239 A 8/1997 Sanchez et al. ............... 320/22
5,708,348 A 1/1998 Frey et al.
5,726,554 A 3/1998 Freiman et al.
5,764,035 A 6/1998 Lee
5,847,546 A 12/1998 Seengupta et al.
5,945,811 A 8/1999 Hasegawa et al.
6,064,179 A 5/2000 Ito et al.
6,075,343 A 6/2000 Hsu
6,137,265 A 10/2000 Cummings et al. ......... 320/133
6,154,012 A 11/2000 Drori ......................... 320/162
6,172,480 B1 1/2001 Vandelac .................... 320/125
6,208,117 B1 3/2001 Hibi (Continued)

FOREIGN PATENT DOCUMENTS

CN 1531163 A 1/2004

(Continued)

OTHER PUBLICATIONS

Co-Pending Application Entitled "AC-DC Adapter And Battery Charger Integration Scheme", U.S. Appl. No. 10/628,921, filed Jul. 29, 2003, 25 pgs.

(Continued)

*Primary Examiner*—Bao Q. Vu
*Assistant Examiner*—Arun Williams
(74) *Attorney, Agent, or Firm*—O'Keefe, Egan, Peterman & Enders LLP

(57) ABSTRACT

Systems and methods for regulating pre-charge current in a battery system, such as a battery system of an information handling system, by controlling duty cycle of the charging current provided to battery cell/s of the battery system.

33 Claims, 5 Drawing Sheets

U.S. PATENT DOCUMENTS

| | | | | |
|---|---|---|---|---|
| 6,254,832 | B1 | 7/2001 | Rainin et al. | |
| 6,377,028 | B1 | 4/2002 | Armstrong, II et al. | |
| 6,380,712 | B2 | 4/2002 | Murphy et al. | 320/107 |
| 6,476,585 | B1 | 11/2002 | Simmonds | 320/162 |
| 6,498,458 | B1 | 12/2002 | Chen | |
| 6,501,249 | B1 | 12/2002 | Drori | 320/149 |
| 6,873,135 | B2 | 3/2005 | Nakatsuji | 320/134 |
| 2001/0035733 | A1 | 11/2001 | Murphy et al. | 320/107 |
| 2001/0048288 | A1* | 12/2001 | Hebding et al. | 320/139 |
| 2002/0195996 | A1 | 12/2002 | Nakatsuji | 320/134 |
| 2003/0178967 | A1 | 9/2003 | Khatri | |
| 2004/0012368 | A1 | 1/2004 | Massey et al. | |
| 2004/0164706 | A1 | 8/2004 | Osborne | 320/132 |
| 2004/0164708 | A1 | 8/2004 | Veselic et al. | |
| 2004/0195996 | A1 | 10/2004 | Nishida | 320/159 |
| 2005/0024016 | A1 | 2/2005 | Breen et al. | 320/140 |
| 2005/0112457 | A1 | 5/2005 | Breen et al. | 429/9 |
| 2005/0162123 | A1 | 7/2005 | Sawyers | |
| 2006/0022633 | A1* | 2/2006 | Nguyen | 320/106 |

FOREIGN PATENT DOCUMENTS

| | | | |
|---|---|---|---|
| EP | 1037358 | A1 | 9/2000 |
| GB | 2183944 | A | 6/1987 |
| GB | 2246916 | A | 2/1992 |
| GB | 2358299 | A | 7/2001 |
| GB | 2359945 | A | 9/2001 |
| JP | 08106922 | A | 4/1996 |
| JP | 08140281 | A | 5/1996 |
| JP | 9233727 | | 9/1997 |
| JP | 10-075540 | | 3/1998 |
| JP | 10-304589 | | 11/1998 |
| JP | 10304589 | | 11/1998 |
| JP | 11262197 | | 9/1999 |
| JP | 11262197 | A | 9/1999 |
| JP | 2002017052 | A | 1/2002 |
| JP | 2003087990 | A | 3/2003 |
| WO | WO99/09635 | | 2/1999 |
| WO | WO2004/075371 | A1 | 9/2004 |
| WO | WO2005/08434 | A2 | 9/2005 |

OTHER PUBLICATIONS

Co-Pending Application Entitled "Systems And Methods For Integration Of Charger Regulation Within A Battery System", U.S. Appl. No. 11/058,781, filed Feb. 16, 2005, 30 pgs.

Microchip, Pic12F629/675 Data Sheet, 8-Pin Flash-Based 8-Bit CMOS Microcontrollers, 2003, 132 pgs.

Search Report; May 11, 2006; 6 pgs.

Co-Pending Application Entitled "Battery Systems For Information Handling Systems", U.S. Appl. No. 11/527,126, filed Sep. 26, 2006, 33 pgs.

* cited by examiner

320
$I_{CHARGE}$
422
$V_{CELL}$
324
462
416
420
460
414
418
370
CELL VOLTAGE DETECT 310
A/D
CURRENT SENSE 308
DUTY CYCLE CONTROL 311
MICRO-CONTROLLER
406
412
404
402
Batt+
312
426
SMC
SMD
428
Batt-
314

SYSTEMS AND METHODS FOR REGULATING PULSED PRE-CHARGE CURRENT IN A BATTERY SYSTEM

BACKGROUND OF THE INVENTION

1. Field of the Invention

This invention relates generally to battery systems, and more particularly to regulating pre-charge current in a battery system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of portable information handling systems include notebook computers. These portable electronic devices are typically powered by battery systems such as lithium ion ("Li-ion") or nickel metal hydride ("NiMH") battery packs including one or more rechargeable batteries. FIG. 1 shows a battery system 120 of a portable information handling system 100 having battery charge terminals 122, 124 that are temporarily coupled to corresponding charge output terminals 115, 116 of a battery charging apparatus 110. As so configured, battery charging apparatus 110 is coupled to receive current from current supply terminals 112, 114 (e.g., alternating current, or direct current from an AC adapter) and to provide DC charging current to battery charge terminals 122, 124 of battery system 120 via charge output terminals 115, 116. As shown, battery system 120 also includes battery system data bus terminals 126, 128 for providing battery state information, such as battery voltage, to corresponding battery charging apparatus data bus terminals 117, 118.

FIG. 2 shows a conventional lithium ion battery system 120 having a battery management unit ("BMU") 202 responsible for monitoring battery system operation and for controlling battery system charge and discharge circuitry 270 that is present to charge and discharge one or more battery cells of the battery system. As shown, BMU 202 includes analog front end ("AFE") 206 and microcontroller 204. Charge and discharge circuitry 270 of battery system 120 includes two field effect transistors ("FETs") 214 and 216 coupled in series between battery charge terminal 122 and battery cell/s 224. FET 214 is a charge FET switching element that forms a part of charge circuit 260 that is controlled by the microcontroller 204 and/or AFE 206 of BMU 202 using switch 218 to allow or disallow charging current to the lithium ion battery cell/s 224, and FET 216 is a discharge FET switching element that forms a part of discharge circuit 262 that is controlled by microcontroller 204 and/or AFE 206 of BMU 202 using switch 220 to allow or disallow discharge current from the battery cell/s 224. As shown, parasitic diodes are present across the source and drain of each FET switching element, i.e., to conduct charging current to the battery cell/s when the discharge FET switching element 216 is open, and to conduct discharging current from the battery cell/s when the charge FET switching element 214 is open.

During normal battery pack operations both charge and discharge FET switching elements 214 and 216 are placed in the closed state by respective switches 218 and 220, and cell voltage detect circuitry 210 of AFE 206 monitors voltage of battery cell/s 224. If cell voltage detect circuitry 210 of AFE 206 detects a battery over-voltage condition, BMU 202 opens the charge FET switching element 214 to prevent further charging of the battery cell/s until the over-voltage condition is no longer present. Similarly, if the cell voltage detect circuitry 210 of AFE 206 detects a battery under-voltage (or over-discharge) condition, BMU 202 opens the discharge FET switching element 216 to prevent further discharging of the battery cell/s until the under-voltage condition is no longer present. BMU 202 may also open the charge FET switching element 214 when the battery pack is in sleep mode. A current sense resistor 212 is present in the battery pack circuitry to allow current sensor 208 of AFE 206 to monitor charging current to the battery cell/s. If the charge FET switching element 214 is supposed to be open (e.g., during sleep mode or battery over-voltage condition) but charging current is detected, BMU 202 permanently disables the battery pack by blowing an inline fuse 222 present in the battery circuitry to open the battery pack circuitry and prevent further over-charging.

When Li-ion and NiMH battery cells have been discharged to a certain low voltage level, they are not ready to receive their full charging current and must be "pre-charged" at a much lower current level. For example, a typical minimum charging current from a smart charger is 128 milliamperes, which may be sufficiently low for pre-charging some NiMH battery cells. However, the required pre-charge current for other types of battery cells may be much lower than 128 milliamperes. For a typical Li-ion battery cell, the required pre-charge current is about 20 milliamperes or less per cell. To provide the required pre-charge current, separate pre-charge circuitry has been incorporated into a battery pack to achieve the desired pre-charge current level by reducing the charging current supplied by a battery charging apparatus.

FIG. 2 illustrates pre-charge circuitry 250 that is present in charge and discharge circuitry 270 to pre-charge battery cell/s 224 when battery cell/s 224 have been discharged to a predetermined low voltage level and are not ready to receive their full charging current. As shown, pre-charge circuitry 250 includes MOSFET 252, used as a switch, and a resistor 254 to limit the level of the pre-charge current to a much lower current value than the charging current provided by battery charging apparatus 110. During pre-charging mode, microcontroller 204 turns on MOSFET switch 252 when cell voltage detect circuitry 210 of AFE 206 detects that voltage of battery cell/s 224 is below the predetermined low voltage level and the pre-charge current level is needed. During pre-charge mode, BMU 202 also maintains charge FET switching element 214 in open state to limit the charging current provided to battery cell/s 224 to the lower pre-charge current level. When voltage of battery cell/s 224 reaches the predetermined low voltage level, BMU 202 turns off MOSFET 252 and closes charge FET switching element 214 to allow the full charging current to be provided to battery cell/s 224.

As shown in FIG. 2, pre-charge circuitry 250 of conventional lithium ion battery system 120 requires provision of separate circuitry components in the battery system. Due to safety and cost reasons, no such pre-charge circuitry components may be provided for some battery systems, such as NiMH battery systems. In such systems, components of the battery charging apparatus are used to regulate the pre-charge current level.

SUMMARY OF THE INVENTION

Disclosed herein are systems and methods for regulating pre-charge current in a battery system, such as a battery system of an information handling system. The disclosed systems and methods may be advantageously configured to regulate the duty cycle of battery system charging current to regulate the level of the pre-charge current. In one embodiment, the microcontroller of a battery system may be used to adjust the duty cycle of the battery system charge FET switching element (C-FET) in the absence of separate pre-charge circuitry (such as pre-charge circuitry 250 of FIG. 2) and/or without the presence of battery charging apparatus pre-charge circuitry, while at the same time meeting battery cell pre-charge requirements, e.g., Li-ion battery cell requirements. In one exemplary embodiment, a battery system for a portable information handling system, such as a notebook computer, may be provided with the capability of regulating the pre-charge current level for battery cell/s of the battery system by adjusting the duty cycle of the charging current provided to the battery cell/s, and without the presence of MOSFET switch components of conventional pre-charge circuitry. Thus, the disclosed systems and methods may be advantageously implemented in one embodiment to eliminate the need for separate pre-charge circuitry components and to reduce the number of parts inside the battery system, resulting in cost savings and less required space on the battery system printed circuit board.

In one respect, disclosed herein is a method of charging one or more battery cells of a battery system coupled to a battery charging apparatus, including: receiving a charging current in the battery system from the battery charging apparatus, the charging current having a first current value; adjusting the duty cycle of the charging current received in the battery system to produce a pre-charging current having a second current value, the second current value being less than the first current value; and charging the one or more battery cells of the battery system by first providing the pre-charging current having a second current value to the one or more battery cells of the battery system, and then providing the charging current having the first current value to the one or more battery cells of the battery system.

In another respect, disclosed herein is a battery system configured to be coupled to a battery charging apparatus, the battery system including: one or more battery cells; battery current control circuitry configured to be coupled between the battery charging apparatus and the one or more battery cells, the battery current control circuitry being configured to receive a charging current having a first current value from the battery charging apparatus, and to control flow of the charging current to the battery cells from the battery charging apparatus; and a duty cycle controller coupled to the battery current control circuitry, the duty cycle controller being configured to control operation of the battery current circuitry so as to adjust a duty cycle of the charging current received from the battery charging apparatus to provide a pre-charging current having a second current value to the one or more battery cells, the second current value being less than the first current value. The duty cycle controller may be further configured to first provide the pre-charging current having a second current value to the one or more battery cells of the battery system, and then to provide the charging current having the first current value to the one or more battery cells of the battery system.

In another respect, disclosed herein is a battery system for a portable information handling system configured to be coupled to a battery charging apparatus, the battery system including: one or more battery cells; a charge circuit configured to be coupled between the battery charging apparatus and the one or more battery cells, the charge circuit including a charge FET switching element and being configured to receive a charging current having a first current value from the battery charging apparatus; and a battery management unit (BMU) coupled to the charge circuit, the BMU including a microcontroller. The BMU may be configured to control operation of the charge FET switching element of the charge circuit so as to adjust a duty cycle of the charging current received from the battery charging apparatus to provide a pre-charging current having a second current value to the one or more battery cells, the second current value being less than the first current value. The BMU may be further configured to first provide the pre-charging current having a second current value to the one or more battery cells of the battery system when a voltage of the one or more battery cells of the battery system is below a low voltage threshold, and then to provide the charging current having the first current value to the one or more battery cells of the battery system when a voltage of the one or more battery cells of the battery system reaches the low voltage threshold.

DESCRIPTION OF ILLUSTRATIVE EMBODIMENTS

Figure 3:
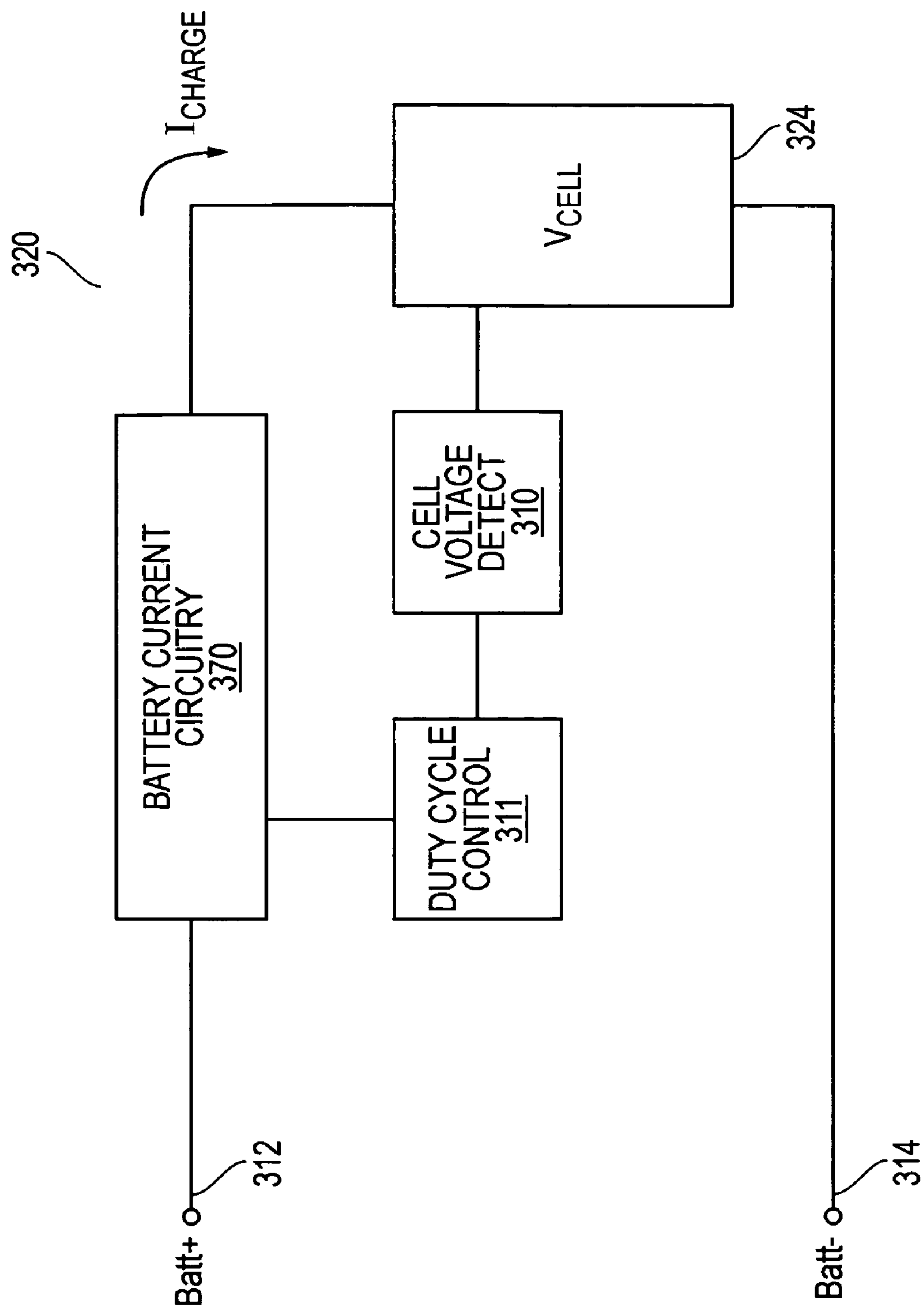
FIG. 3 is a block diagram of a battery system according to one embodiment of the disclosed systems and methods.

FIG. 3 shows a battery system 320 according to one embodiment of the disclosed systems and methods. Battery system 320 may be configured as a stand alone source of DC current, or may be provided as a permanent or replaceable component of a portable electronic device (e.g., battery pack of a portable information handling system such as a notebook computer). Besides notebook computers, other examples of such portable electronic devices include, but are not limited to, portable telephone devices (e.g., cellular phones, cordless phones, etc.), personal digital assistant ("PDA") devices, MP3 players, cameras, computer peripherals, etc. In addition to portable electronic devices, it will be understood that the disclosed systems and methods may be implemented to power any other type of electronic device that is at least partially battery powered and that has electronic circuitry that is coupled to receive current from a battery system. In this regard, the disclosed systems and methods may be advantageously implemented in applications where smart batteries are employed.

Figure 1:
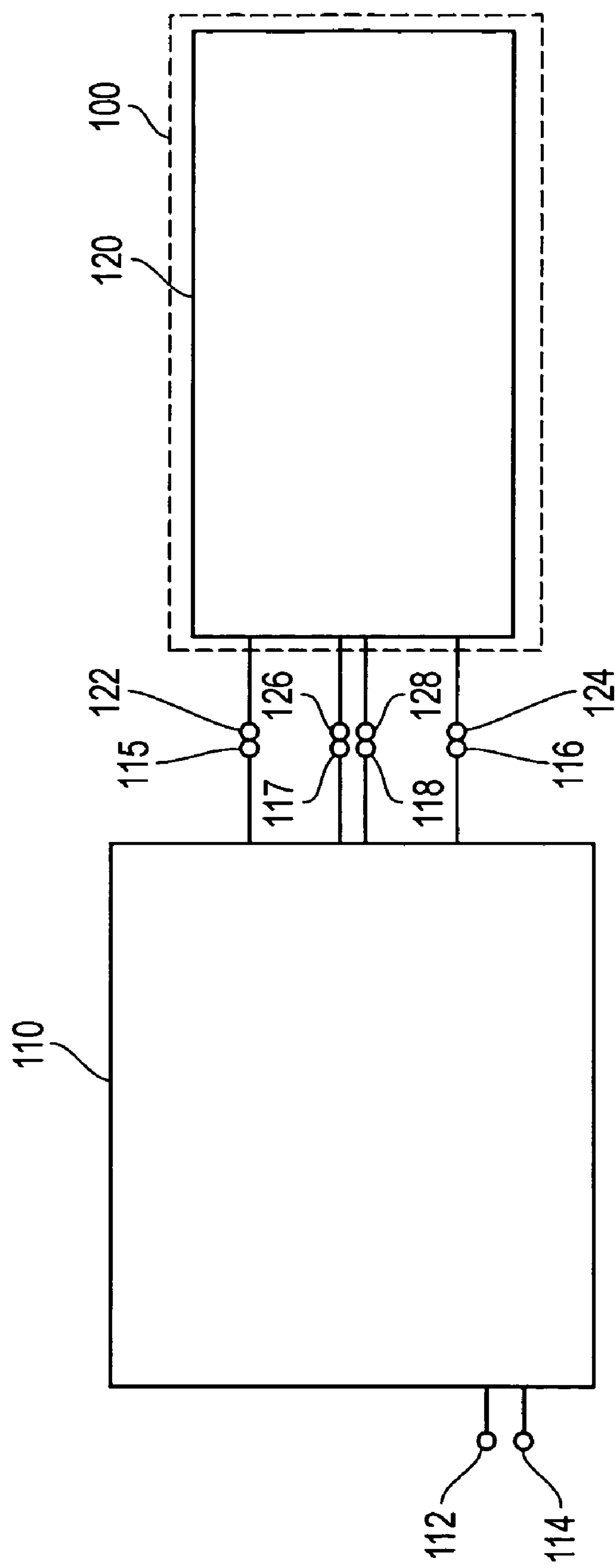
FIG. 1 is a block diagram of a conventional portable electronic device and battery charging apparatus.
Figure 2:
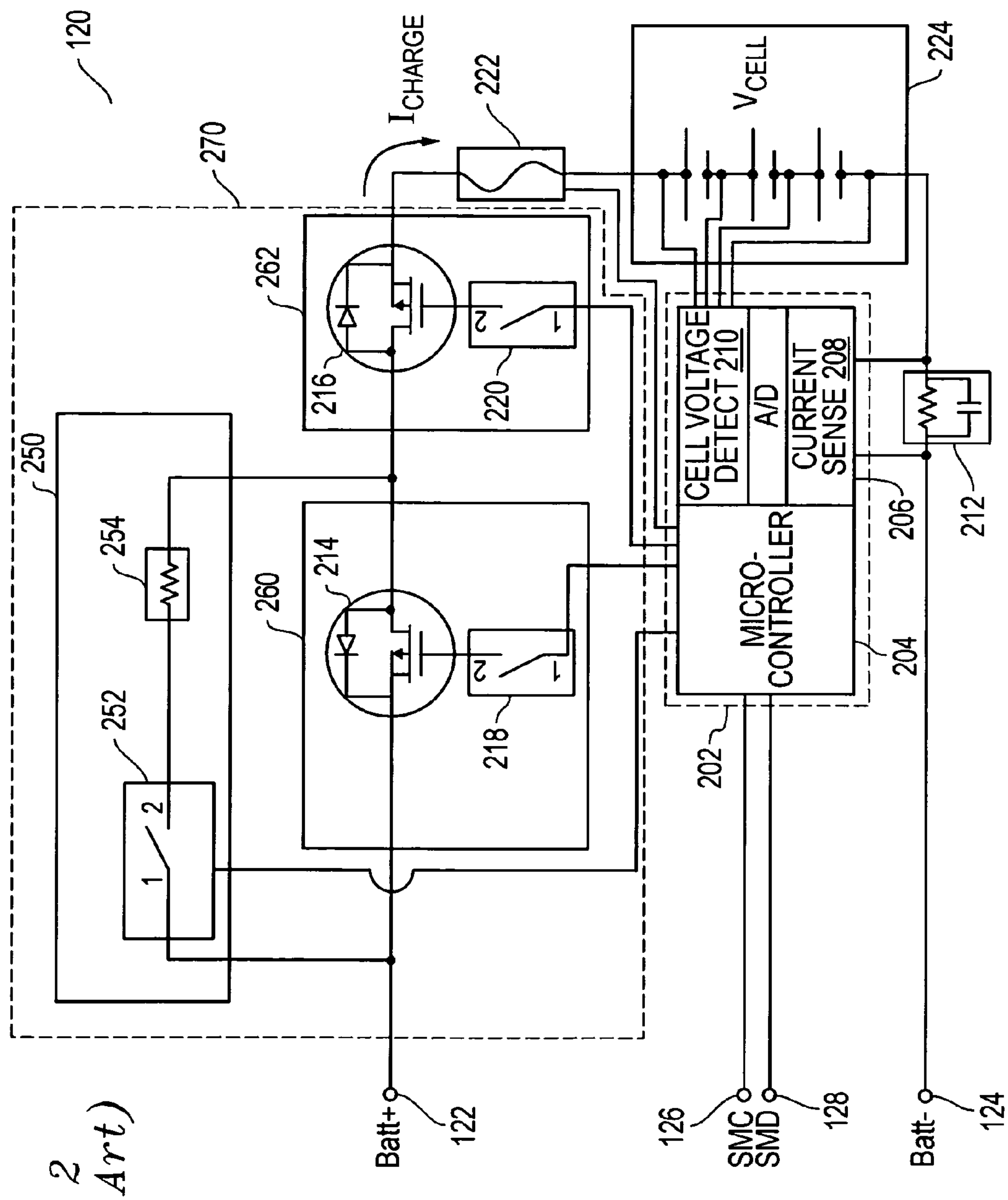
FIG. 2 is a block diagram of a conventional lithium ion battery system.

As shown in FIG. 3, battery system 320 includes one or more battery cell/s 324 coupled to battery terminals 312 and 314 that may be configured to be coupled to a battery charging apparatus (not shown), such as battery charging apparatus 110 of FIG. 1. It will be understood that when battery system 320 is provided as an integrated component of an electronic device, a corresponding battery charging apparatus may also be provided as an integrated part of the same electronic device, or may be provided as an external device to the electronic device. Battery cell/s 324 may be any type of rechargeable battery cell/s or combination thereof that is suitable for recharging using two or more rates of charging current value. Examples of such battery cells include, but are not limited to, Li-ion battery cells, NiMH battery cells, nickel cadmium (NiCd) battery cells, lithium-polymer (Li-polymer) battery cells, etc.

Battery system 320 is also shown provided with battery current control circuitry 370 that is present to control flow of charging current to battery cell/s 324 of battery system 320, and that may be optionally configured to also control flow of discharge current from battery cell/s 324 of battery system 320. Battery current control circuitry 370 is coupled to duty cycle controller 311 that controls operation of battery current control circuitry 370 (e.g., by control signal or other suitable method) in order to control flow of battery charging current ($I_{CHARGE}$) to battery cell/s 324 from a battery charging apparatus via terminals 312 and 314 so as to adjust the duty cycle of charging current provided to battery cell/s 324. Also present is battery cell voltage detector 310 that is coupled to monitor voltage of battery cell/s 324 and to supply this information to duty cycle controller 311. It will be understood that duty cycle controller 311 and battery cell voltage detector 310 may each be implemented using any circuitry and/or control logic configuration suitable for performing the tasks thereof. For example, in one embodiment, one or more features of circuitry 311 and 310 may be implemented using a controller (e.g., processor and associated firmware) that is integral to battery system 320 or using any other suitable configuration of microcontroller/microprocessor, firmware and/or software that interfaces with battery system circuitry/components. Furthermore, although illustrated as separate components, it will be understood that the tasks of duty cycle controller 311 and battery cell voltage detector 310 may alternatively be performed by a single component, or may be performed by a combination of more than two separate components.

In operation of the system of FIG. 3, battery cell voltage detector 310 monitors voltage of battery cell/s 324 and supplies this information to duty cycle controller 311 (e.g., by control signal or other suitable method). In turn, duty cycle controller 311 uses this monitored voltage information to control charging current supplied to battery cell/s 324 through battery current control circuitry 370. In particular, duty cycle controller 311 is configured to pre-charge battery cell/s 324 by controlling the duty cycle of the charging current when voltage of battery cell/s 324 is below a low voltage threshold, and battery cell/s 324 are not ready to receive their full charging current. By controlling the duty cycle of the charging current it is possible for duty cycle controller 311 to limit the level of the pre-charge current to one or more lower current values than the full charging current provided at terminals 312 and 314 by a battery charging apparatus. When voltage of battery cell/s 324 reaches the low voltage threshold, duty cycle controller 311 increases the duty cycle of the charging current to a higher duty cycle so that more charging current is provided to battery cell/s 324, e.g., to allow the full charging current of the battery charging apparatus to be provided to battery cell/s 324.

It will be understood duty cycle controller 311 may be configured to control battery current control circuitry 370 in such a way as to provide a reduced level of pre-charging current from charger to battery cell/s 324 when battery cell voltage is below a voltage threshold, and to provide full charging current when battery cell voltage reaches or exceeds the voltage threshold. In this regard, duty cycle controller 311 may be configured to control battery current control circuitry 370 in such a way as to provide a reduced level of pre-charging current from charger to battery cell/s 324 based on voltage threshold of battery cell/s 324 (e.g., to provide a level of pre-charging current for a 3-cell-in-parallel battery pack, to provide a higher level of pre-charging current for a 4-cell-in-parallel battery pack, etc.).

Figure 4:
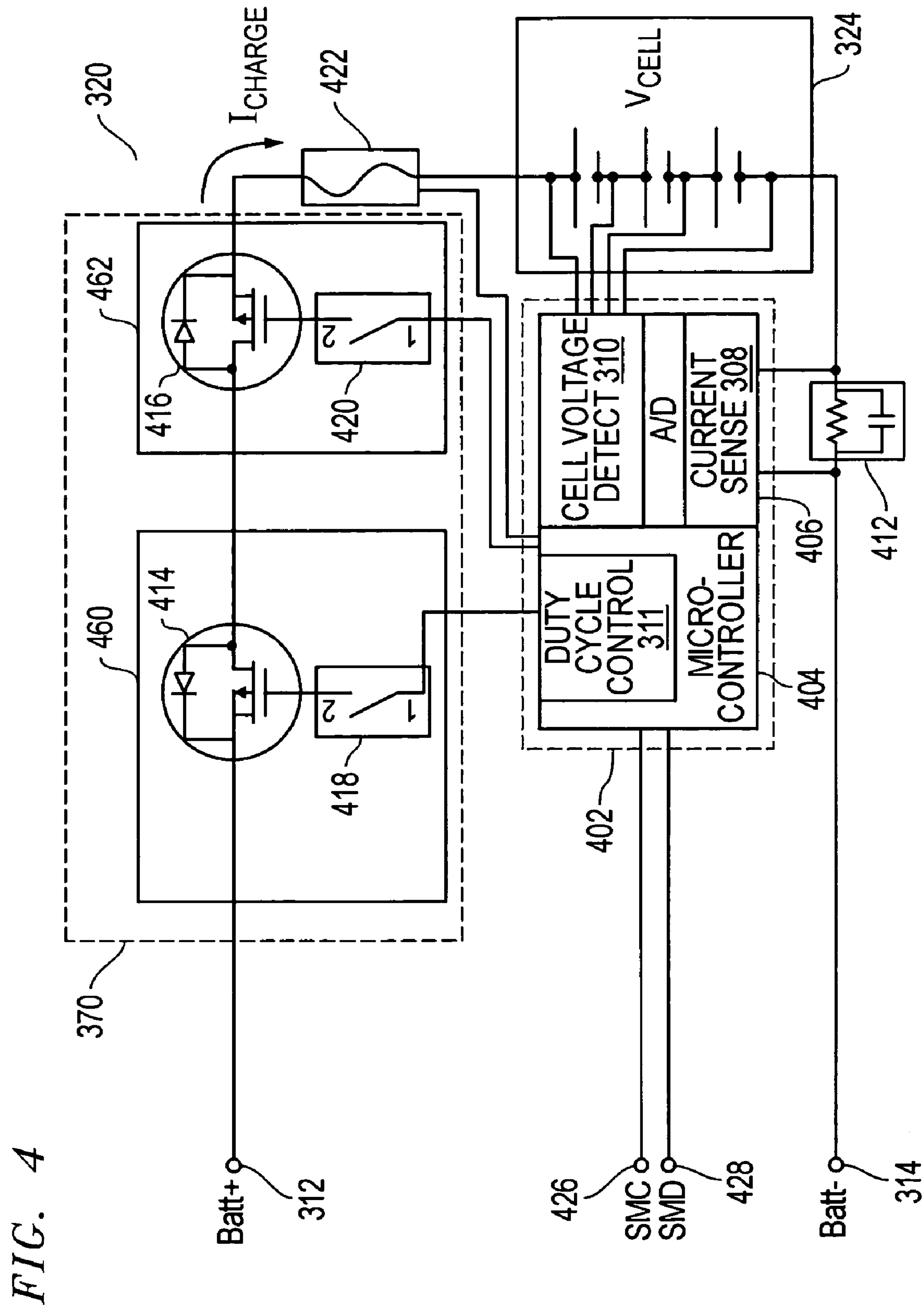
FIG. 4 is a block diagram of a battery system according to one embodiment of the disclosed systems and methods.

FIG. 4 illustrates battery system 320 of FIG. 3 as it may be implemented according to one exemplary embodiment of the disclosed systems and methods. As shown in this exemplary embodiment, functions of duty cycle controller 311 and battery cell voltage detector 310 may be implemented by a battery management unit (BMU) 402 that is responsible for monitoring battery system operation and for controlling battery current control circuitry 370, although any other suitable configuration of circuitry, processor/s and/or control logic may be employed in other embodiments. As shown in FIG. 4, BMU 402 includes analog front end ("AFE") 406 and microcontroller 404. Battery current control circuitry 370 includes charge circuit 460 and discharge circuit 462 coupled in series between battery charge terminal 312 and battery cell/s 324. FET 414 is a charge FET switching element that forms a part of charge circuit 460 that is controlled by microcontroller 404 and/or AFE 406 of the BMU using charge circuit switch 418 to allow or disallow charging current to battery cell/s 324, and FET 416 is a discharge FET switching element that forms a part of discharge circuit 462 that is controlled by the microcontroller 404 and/or AFE 406 of BMU using discharge circuit switch 420 to allow or disallow discharge current from the battery cell/s 324. As shown, battery system 320 also includes battery system data bus terminals 426, 428 for providing battery state information, such as battery voltage, to corresponding data bus terminals of a battery charging apparatus.

During normal battery pack operations both charge and discharge FET switching elements 414 and 416 are placed in the closed state by respective switches 418 and 420, and cell voltage detector 310 of AFE 406 monitors voltage of battery cell/s 324. If cell voltage detector 310 of AFE 406 detects a battery over-voltage condition, BMU 402 opens the charge FET switching element 414 to prevent further charging of the battery cell/s until the over-voltage condition is no longer present. Similarly, if the cell voltage detector 310 of AFE 406 detects a battery under-voltage (or over-discharge) condition, BMU 402 opens the discharge FET switching element 416 to prevent further discharging of the battery cell/s until the under-voltage condition is no longer present. BMU 402 may also open the charge FET switching element 414 when the battery pack is in sleep mode. A current sense resistor 412 is present in the battery pack circuitry to allow current sensor 308 of AFE 406 to monitor charging current to the battery cell/s. If the charge FET switching element 414 is supposed to be open (e.g., during sleep mode or battery over-voltage condition) but charging current is detected, BMU 402 permanently disables the battery pack by blowing an optional inline fuse 422 present in the battery circuitry to open the battery pack circuitry and prevent further over-charging.

When terminals 312, 314 of battery system 320 are coupled to receive current from corresponding terminals of a battery charging apparatus, BMU 402 is configured to enter pre-charging mode when cell voltage detector 310 of AFE 406 detects that voltage of battery cell/s 324 is below a low voltage threshold and a lower pre-charge current level is needed. During pre-charging mode, duty cycle controller 311 of BMU 402 controls switch 418 (e.g., using a pulse width modulated signal) so as to intermittently open and close FET switching element 414 and to provide an intermittent pre-charge current to battery cell/s 324 that is below the full charging current value. When voltage of battery cell/s 324 exceeds the low voltage threshold, BMU 402 closes charge FET switching element 414 to allow the full charging current to be constantly provided to battery cell/s 324 until fully charged.

Figure 5:
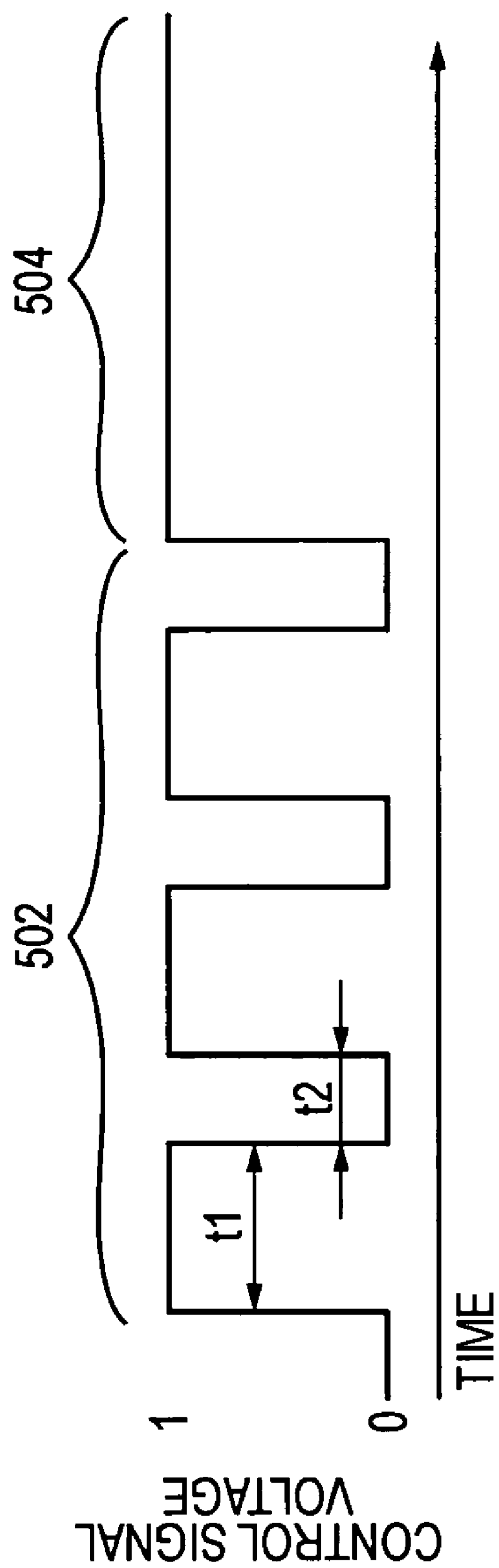
FIG. 5 is a graphical illustration of control signal voltage versus time according to one embodiment of the disclosed systems and methods.

FIG. 5 illustrates current control signal voltage for switch 418 as a function of time for both pre-charge and full charge modes according to one exemplary embodiment of the disclosed systems and methods. In the illustrated embodiment, current is provided to the battery cell/s when the voltage of the current control signal is high or has a value of 1, and no current is provided to the battery cell/s when the voltage of the current control signal is low or has a value of 0.

Still referring to FIG. 5, charging current is intermittently provided to battery cell/s 324 during pre-charge mode 502. As shown for this illustrated embodiment, each current pulse is of substantially the same current level as the other current pulses. During pre-charge mode 502, duty cycle of pre-charge current is represented by t1/(t1+t2), with t1 representing time that current is on and t2 representing time that current is off. As further illustrated in FIG. 5, charging current becomes constant (100% duty cycle) during charge mode 504 once the voltage of battery cell/s 324 reaches the low voltage threshold. In this regard, a duty cycle of 100% may be used to provide the full value of charging current from a battery charging apparatus to battery cell/s 324 (e.g, whenever a situation dictates that full charging current is needed or desirable). It will also be understood that a duty cycle of 0% may be used in one embodiment to stop or terminate flow of charging current.

With regard to the embodiments of FIGS. 3 and 4, it will be understood that the predetermined low voltage threshold that is used to initiate pre-charge mode may vary to fit the needs of a given battery system implementation (e.g., type of battery, number of cells, type of battery charging apparatus, etc.). Similarly, the pre-charge current level and duty cycle values may also be determined to fit the needs of a given battery system implementation.

For example, in one exemplary embodiment for a Li-ion battery system (e.g., 7.5 volt 3S battery pack with three 2.5 volt cells, or 9 volt 3S battery pack with three 3 volt cells), a predetermined low voltage threshold of from about 2.5 to about 3 volts may be used as a threshold between pre-charge current and full charging current modes. Similarly low voltage threshold methodology may be applied to other battery configurations, e.g., 4S battery packs having 4 cells, etc. The value of full charging current to be provided to battery cell/s of the battery system may be determined by multiplying the number of battery cells by the relationship 0.5c, where c is the nominal capacity per cell. The value of c may vary based on battery type, but for Li-ion battery cells of this embodiment may have a value of from about 2200 to about 2400 milliamperes/hour/cell. Thus, for a Li-ion battery system having three cells and a nominal capacity (c) of about 2200 milliamperes/hour/cell, full charging current may be determined to be about 3.3 amps. For the same Li-ion battery system embodiment, pre-charge current may be determined by multiplying the number of battery cells by a value of from about 20 to about 50 milliamperes/cell. Thus, using a value of 50 milliamperes/cell for a Li-ion battery system having two cells coupled in parallel, pre-charge current may be determined to be about 100 milliamperes.

The appropriate duty cycle required to give the desired pre-charge current level may be determined based on the desired level of pre-charge current (e.g., as determined according to the above) and the available current provided by the battery charging apparatus. For example, in one exemplary embodiment, a battery charging apparatus for configured for charging Li-ion battery systems may have a charging rate of about 150 amperes. In another exemplary embodiment a battery charging apparatus may have a lower (pre-charge) current rate of about 128 milliamperes that may be provided when needed, e.g., upon signal received from microcontroller 404 via battery system data bus terminals 426, 428. In any case, pre-charge duty cycle may be adjusted to deliver the desired pre-charge current to battery cell/s 324 based upon the current provided by the battery charging apparatus at terminals 312, 314. For example, given a desired pre-charge current of 100 milliamperes and a current of about 150 milliamperes provided by a battery charging apparatus, a duty cycle of about 66% may be implemented by duty cycle controller 311 of microcontroller 404. In one exemplary embodiment, a single duty cycle value between 0% and 100% may be employed to give the desired pre-charge current level for one battery pack (e.g., having 3 to 4 cells).

The appropriate duty cycle required to give the desired pre-charge current level may also vary based on the number of battery cells in a given battery pack. For example, for a Li-ion battery pack having 2 groups of battery cells in parallel and 3 groups of battery cells in series, a duty cycle may be selected to be about 31% to deliver a total pre-charge current of about 40 milliamperes to the battery cells given that the charging current supplied from a battery charging apparatus is about 128 milliamperes. For a Li-ion battery pack having 3 groups of battery cells in parallel and 3 groups of battery cells in series, a duty cycle may be selected to be about 47% to deliver a total pre-charge current of 60 milliamperes to the battery cells.

In the practice of the disclosed systems and methods, pre-charge duty cycle of duty cycle controller 311 may have any frequency suitable for providing a desired pre-charge current level to battery cell/s 324. However, in one exemplary embodiment, duty cycle frequency may be selected to be higher (e.g., greater than or equal to about 2 times higher, alternatively from about 2 times to about 5 times higher) than the sampling rate of current sensor 308 of AFE 406 to improve accuracy of current sampled by the current sensor. For example, given a current sense sampling rate of about 250 milliseconds or 4 hertz, a duty cycle of at least about 8 hertz (125 milliseconds), alternatively from about 8 hertz (125 milliseconds) to about 20 hertz (50 milliseconds), may be employed to ensure accurate measurement of current by current sensor 308.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of charging one or more battery cells of a battery pack coupled to a battery charging apparatus, comprising:

providing said battery pack as a replaceable battery pack of an information handling system coupled to said battery charging apparatus;

receiving a charging current in said battery pack from said battery charging apparatus, said charging current having a first current value that is the full value of charging current provided to said battery pack by said battery charging apparatus;

adjusting the duty cycle of said charging current after it is received in said battery pack to produce a pulsed pre-charging current having a second current value, said second current value being less than said first current value; and charging said one or more battery cells of said battery pack by first entering a pre-charging mode when a voltage of said one or more battery cells of said battery pack is below a low voltage threshold by controlling the duty cycle of said charging current after it is received in said battery pack from said battery charging apparatus to limit the level of said pulsed pre-charging current to said second current value that is lower than said first current value provided by said battery charging apparatus, and then entering a full charge mode when a voltage of said one or more battery cells of said battery pack reaches said low voltage threshold by increasing the duty cycle of said charging current after it is received in said battery pack from said battery charging apparatus to a higher duty cycle to allow said charging current from said battery charging apparatus having said first current value to be provided to said battery pack until said one or more battery cells are fully charged;

wherein a duty cycle of said charging current is represented by t1/(t1+t2), with t1 representing time that current is on and t2 representing time that current is off such that a duty cycle of 100% provides said full value of said charging current from said battery charging apparatus to said one or more battery cells, and such that a duty cycle of 0% stops flow of said charging current from said battery charging apparatus to said one or more battery cells.

2. The method of claim 1, wherein said battery pack comprises a battery pack of a portable information handling system.

3. The method of claim 2, wherein said one or more battery cells of said battery pack comprise Li-ion or NiMH battery cells.

4. The method of claim 1, wherein said battery pack comprises:

battery current control circuitry coupled between said battery charging apparatus and said one or more battery cells, said battery current control circuitry including a charge circuit having a charge FET switching element;

a battery management unit (BMU) including a microcontroller and an analog front end (AFE) circuitry, said BMU being coupled to said battery current control circuitry and being configured to control said charge FET switching element, and said AFE being coupled to said one or more battery cells and being configured to monitor said voltage of said one or more battery cells; and wherein said method further comprises:

using said BMU to adjust the duty cycle of said charging current received in said battery pack by controlling said charge FET switching element to produce said pulsed pre-charging current having said second current value to provide said pre-charging current to said one or more battery cells of said battery pack when said voltage of said one or more battery cells of said battery pack monitored by said AFE is below said low voltage threshold, and using said BMU to adjust the duty cycle of said charging current received in said battery pack by controlling said charge FET switching element to provide said charging current having said first current value to said one or more battery cells of said battery pack when said voltage of said one or more battery cells of said battery pack monitored by said AFE reaches said low voltage threshold.

5. The method of claim 4, wherein said battery pack comprises a battery pack of a portable information handling system.

6. The method of claim 5, wherein said one or more battery cells of said battery pack comprise Li-ion or NiMH battery cells.

7. The method of claim 5, wherein said portable information handling system comprises a notebook computer.

8. The method of claim 4, wherein said AFE is further coupled to monitor current provided to said one or more battery cells or from said one or more battery cells; and wherein a duty cycle of said pulsed pre-charging current is higher than the current monitoring sampling rate of said AFE.

9. The battery pack of claim 8, wherein a frequency of said duty cycle is greater than about 2 times the current monitoring sampling rate of said AFE.

10. The method of claim 4, wherein said charging current is received from said battery charging apparatus at terminals of said battery pack, and wherein said method further comprises using said BMU to adjust the duty cycle of said charging current received in said battery pack by:

determining said duty cycle based on a desired level of pre-charge current and based on said first current value of said full value of said charging current provided to said terminals of said battery pack by said battery charging apparatus, said desired level of pre-charge current having said second current value; and adjusting said duty cycle of said charging current after it is received at said terminals of said battery pack to produce said pulsed pre-charging current having said desired second current value.

11. The method of claim 1, wherein said battery pack is configured to be temporarily coupled to receive current from said battery charging apparatus.

12. The method of claim 1, wherein said charging current is received from said battery charging apparatus at terminals of said battery pack, and wherein said method further comprises:

determining said duty cycle based on a desired level of pre-charge current and based on said first current value of said full value of said charging current provided to said terminals of said battery pack by said battery charging apparatus, said desired level of pre-charge current having said second current value; and adjusting said duty cycle of said charging current after it is received at said terminals of said battery pack to produce said pulsed pre-charging current having said desired second current value.

13. The method of claim 12, further comprising determining said desired second level of pre-charge current based on a number and capacity of battery cells of said battery pack.

14. A battery pack configured to be coupled to a battery charging apparatus, said battery pack comprising:

one or more battery cells;

battery current control circuitry configured to be coupled between said battery charging apparatus and said one or more battery cells, said battery current control circuitry being configured to receive a charging current having a first current value from said battery charging apparatus that is the full value of charging current provided to said battery pack by said battery charging apparatus, and to control flow of said charging current to said battery cells from said battery charging apparatus; and a duty cycle controller coupled to said battery current control circuitry, said duty cycle controller being configured to control operation of said battery current circuitry so as to adjust a duty cycle of said charging current after it is received in said battery pack from said battery charging apparatus to provide a pulsed pre-charging current having a second current value to said one or more battery cells, said second current value being less than said first current value;

wherein said duty cycle controller is further configured to first enter a pre-charging mode when a voltage of said one or more battery cells of said battery pack is below a low voltage threshold by controlling the duty cycle of said charging current after it is received in said battery pack from said battery charging apparatus to limit the level of said pulsed pre-charging current to said second current value that is lower than said first current value provided by said battery charging apparatus, and then to enter a full charge mode when a voltage of said one or more battery cells of said battery pack reaches said low voltage threshold by increasing the duty cycle of said charging current after it is received in said battery pack from said battery charging apparatus to a higher duty cycle to allow said charging current from said battery charging apparatus having said first current value to be provided to said battery pack until said one or more battery cells are fully charged;

wherein said duty cycle controller is further configured to control operation of said battery current circuitry to produce a duty cycle of said charging current that is represented by t1/(t1+t2), with t1 representing time that current is on and t2 representing time that current is off and such that a duty cycle of 100% provides said full value of said charging current from said battery charging apparatus to said one or more battery cells, and such that a duty cycle of 0% stops flow of said charging current from said battery charging apparatus to said one or more battery cells; and wherein said battery pack is a replaceable battery pack of an information handling system.

15. The battery pack of claim 14, further comprising a battery cell voltage detector coupled to monitor voltage of said one or more battery cells, and coupled to provide a signal representative of said monitored voltage to said duty cycle controller.

16. The battery pack of claim 15, wherein said battery current control circuitry comprises a charge circuit having a charge FET switching element; wherein said duty cycle controller comprises a microcontroller of a battery management unit (BMU); and wherein said battery voltage detector comprises an analog front end (AFE) of said BMU.

17. The battery pack of claim 16, wherein said AFE is further coupled to monitor current provided to said one or more battery cells or from said one or more battery cells; and wherein a frequency of said duty cycle is greater than about 2 times the current monitoring sampling rate of said AFE.

18. The battery pack of claim 14, wherein said battery pack comprises a battery pack of a portable information handling system.

19. The battery pack of claim 18, wherein said one or more battery cells of said battery pack comprise Li-ion or NiMH battery cells.

20. The battery pack of claim 18, wherein portable information handling system comprises a notebook computer.

21. The battery pack of claim 14, wherein said battery pack is configured to be temporarily coupled to receive current from said battery charging apparatus.

22. The battery pack of claim 14, wherein said battery pack comprises terminals configure to receive said charging current from said battery charging apparatus; and wherein said duty cycle controller is further configured to:

determine said duty cycle based on a desired level of pre-charge current and based on said first current value of said full value of said charging current provided to said terminals of said battery pack by said battery charging apparatus, said desired level of pre-charge current having said second current value; and control operation of said battery current circuitry so as to adjust said duty cycle of said charging current after it is received at said terminals of said battery pack to produce said pulsed pre-charging current having said desired second current value.

23. A battery pack for a portable information handling system configured to be coupled to a battery charging apparatus, said battery pack comprising:

one or more battery cells;

a charge circuit configured to be coupled between said battery charging apparatus and said one or more battery cells, said charge circuit comprising a charge FET switching element and being configured to receive a charging current having a first current value from said battery charging apparatus that is the full value of charging current provided to said battery pack by said battery charging apparatus; and a battery management unit (BMU) coupled to said charge circuit, said BMU comprising a microcontroller;

wherein said BMU is configured to control operation of said charge FET switching element of said charge circuit so as to adjust a duty cycle of said charging current after it is received in said battery pack from said battery charging apparatus to provide a pulsed pre-charging current having a second current value to said one or more battery cells, said second current value being less than said first current value;

wherein said BMU is further configured to first enter a pre-charging mode when a voltage of said one or more battery cells of said battery pack is below a low voltage threshold by controlling the duty cycle of said charging current after it is received in said battery pack from said battery charging apparatus to limit the level of said pulsed pre-charging current to said second current value that is lower than said first current value provided by said battery charging apparatus, and then to enter a full charge mode when a voltage of said one or more battery cells of said battery pack reaches said low voltage threshold by increasing the duty cycle of said charging current after it is received in said battery pack from said battery charging apparatus to a higher duty cycle to allow said charging current from said battery charging apparatus having said first current value to be provided to said battery pack until said one or more battery cells are fully charged;

wherein said BMU is further configured to control operation of said battery current circuitry to produce a duty cycle of said charging current that is represented by t1/(t1+t2), with t1 representing time that current is on and t2 representing time that current is off and such that a duty cycle of 100% provides said full value of said charging current from said battery charging apparatus to said one or more battery cells, and such that a duty cycle of 0% stops flow of said charging current from said battery charging apparatus to said one or more battery cells; and wherein said battery pack is a replaceable, battery pack of said portable information handling system.

24. The battery pack of claim 23, wherein said BMU further comprises an analog front end (AFE) coupled to monitor said voltage of said one or more battery cells.

25. The battery pack of claim 24, wherein said AFE further comprises a current sensor coupled to monitor current provided to said one or more battery cells or from said one or more battery cells; and wherein a frequency of said duty cycle is higher than the sampling rate of said current sensor.

26. The battery pack of claim 25, wherein a frequency of said duty cycle is greater than about 2 times the sampling rate of said current sensor.

27. The battery pack of claim 23, wherein said one or more battery cells of said battery pack comprise Li-ion or NiMH battery cells.

28. The battery pack of claim 23, wherein portable information handling system comprises a notebook computer.

29. The battery pack of claim 23, wherein said battery pack is configured to be temporarily coupled to receive current from said battery charging apparatus.

30. The battery pack of claim 23, wherein said battery pack comprises terminals configure to receive said charging current from said battery charging apparatus; and wherein said BMU is further configured to:

determine said duty cycle based on a desired level of pre-charge current and based on said first current value of said full value of said charging current provided to said terminals of said battery pack by said battery charging apparatus, said desired level of pre-charge current having said second current value; and control operation of said charge FET switching element of said charge circuit so as to adjust said duty cycle of said charging current after it is received at said terminals of said battery pack to produce said pulsed pre-charging current having said desired second current value.

31. A method of charging one or more battery cells of a battery pack coupled to a battery charging apparatus, comprising:

providing said battery pack as a replaceable battery pack of an information handling system coupled to said battery charging apparatus;

receiving a charging current in said battery pack from said battery charging apparatus, said charging current having a first current value that is the full value of charging current provided to said battery pack by said battery charging apparatus;

adjusting a duty cycle of said charging current after it is received in said battery pack to produce a pulsed pre-charging current having a second current value, said second current value being equal to said first current value provided by said battery charging apparatus times said duty cycle; and charging said one or more battery cells of said battery pack by first entering a pre-charging mode when a voltage of said one or more battery cells of said battery pack is below a low voltage threshold by controlling the duty cycle of said charging current after it is received in said battery pack from said battery charging apparatus to limit the level of said pulsed pre-charging current to said second current value that is equal to said first current value provided by said battery charging apparatus times said duty cycle, and then entering a full charge mode when a voltage of said one or more battery cells of said battery pack reaches said low voltage threshold by increasing the duty cycle of said charging current after it is received in said battery pack from said battery charging apparatus to a higher duty cycle to allow said charging current from said battery charging apparatus having said first current value to be provided to said battery pack until said one or more battery cells are fully charged;

wherein a duty cycle of said charging current is represented by t1/(t1+t2), with t1 representing time that current is on and t2 representing time that current is off such that a duty cycle of 100% provides said full value of said charging current from said battery charging apparatus to said one or more battery cells, and such that a duty cycle of 0% stops flow of said charging current from said battery charging apparatus to said one or more battery cells;

wherein a micro-controller determines a required duty cycle based on a desired second current value and based on said first current value from said battery charging apparatus; and wherein said microcontroller controls a frequency of said pulsed pre-charging current.

32. A battery pack configured to be coupled to a battery charging apparatus, said battery pack comprising:

one or more battery cells;

battery current control circuitry configured to be coupled between said battery charging apparatus and said one or more battery cells, said battery current control circuitry being configured to receive a charging current having a first current value from said battery charging apparatus that is the full value of charging current provided to said battery pack by said battery charging apparatus, and to control flow of said charging current to said battery cells from said battery charging apparatus; and a duty cycle controller coupled to said battery current control circuitry, said duty cycle controller being configured to control operation of said battery current circuitry so as to adjust a duty cycle of said charging current after it is received in said battery pack from said battery charging apparatus to provide a pulsed pre-charging current having a second current value to said one or more battery cells, said second current value being equal to said first current value provided by said batter charging apparatus times said duty cycle;

wherein said micro-controller is configured to determine a required duty cycle based on a desired second current value and based on said first current value from said battery charging apparatus, and wherein said microcontroller is configured to control a frequency of said pulsed pre-charging current;

wherein said duty cycle controller is further configured to first enter a pre-charging mode when a voltage of said one or more battery cells of said battery pack is below a low voltage threshold by controlling the duty cycle of said charging current after it is received in said battery pack from said battery charging apparatus to limit the level of said pulsed pre-charging current to said second current value that is equal to said first current value provided by said battery charging apparatus times said duty cycle, and then to enter a full charge mode when a voltage of said one or more battery cells of said battery pack reaches said low voltage threshold by increasing the duty cycle of said charging current after it is received in said battery pack from said battery charging apparatus to a higher duty cycle to allow said charging current from said battery charging apparatus having said first current value to be provided to said battery pack until said one or more battery cells are fully charged;

wherein said duty cycle controller is further configured to control operation of said battery current circuitry to produce a duty cycle of said charging current that is represented by t1/(t1+t2), with t1 representing time that current is on and t2 representing time that current is off and such that a duty cycle of 100% provides said full value of said charging current from said battery charging apparatus to said one or more battery cells, and such that a duty cycle of 0% stops flow of said charging current from said battery charging apparatus to said one or more battery cells; and wherein said battery pack is a replaceable battery pack of an information handling system.

33. A battery pack for a portable information handling system configured to be coupled to a battery charging apparatus, said battery pack comprising:

one or more battery cells;

a charge circuit configured to be coupled between said battery charging apparatus and said one or more battery cells, said charge circuit comprising a charge FET switching element and being configured to receive a charging current having a first current value from said battery charging apparatus that is the full value of charging current provided to said battery pack by said battery charging apparatus; and a battery management unit (BMU) coupled to said charge circuit, said BMU comprising a microcontroller;

wherein said BMU is configured to control operation of said charge FET switching element of said charge circuit so as to adjust a duty cycle of said charging current after it is received in said battery pack from said battery charging apparatus to provide a pulsed pre-charging current having a second current value to said one or more battery cells, said second current value being equal to said first current value provided by said batter charging apparatus times said duty cycle;

wherein said BMU is further configured to first enter a pre-charging mode when a voltage of said one or more battery cells of said battery pack is below a low voltage threshold by controlling the duty cycle of said charging current after it is received in said battery pack from said battery charging apparatus to limit the level of said pulsed pre-charging current to said second current value that is said first current value, provided by said battery charging apparatus, times duty cycle and then to enter a full charge mode when a voltage of said one or more battery cells of said battery pack reaches said low voltage threshold by increasing the duty cycle of said charging current after it is received in said battery pack from said battery charging apparatus to a higher duty cycle to allow said charging current from said battery charging apparatus having said first current value to be provided to said battery pack until said one or more battery cells are fully charged;

wherein said BMU is further configured to control operation of said battery current circuitry to produce a duty cycle of said charging current that is represented by t1/(t1+t2), with t1 representing time that current is on and t2 representing time that current is off and such that a duty cycle of 100% provides said full value of said charging current from said battery charging apparatus to said one or more battery cells, and such that a duty cycle of 0% stops flow of said charging current from said battery charging apparatus to said one or more battery cells;

wherein said BMU comprises a micro-controller configured to determine a required duty cycle based on a desired second current value and based on said first current value from said battery charging apparatus, and wherein said microcontroller is configured to control a frequency of said pulsed pre-charging current; and wherein said battery pack is a replaceable battery pack of said portable information handling system.

* * * * *